(No Model.)
E. WESTON.
ART OF UTILIZING SOLAR RADIANT ENERGY.
No. 389,125. Patented Sept. 4, 1888.
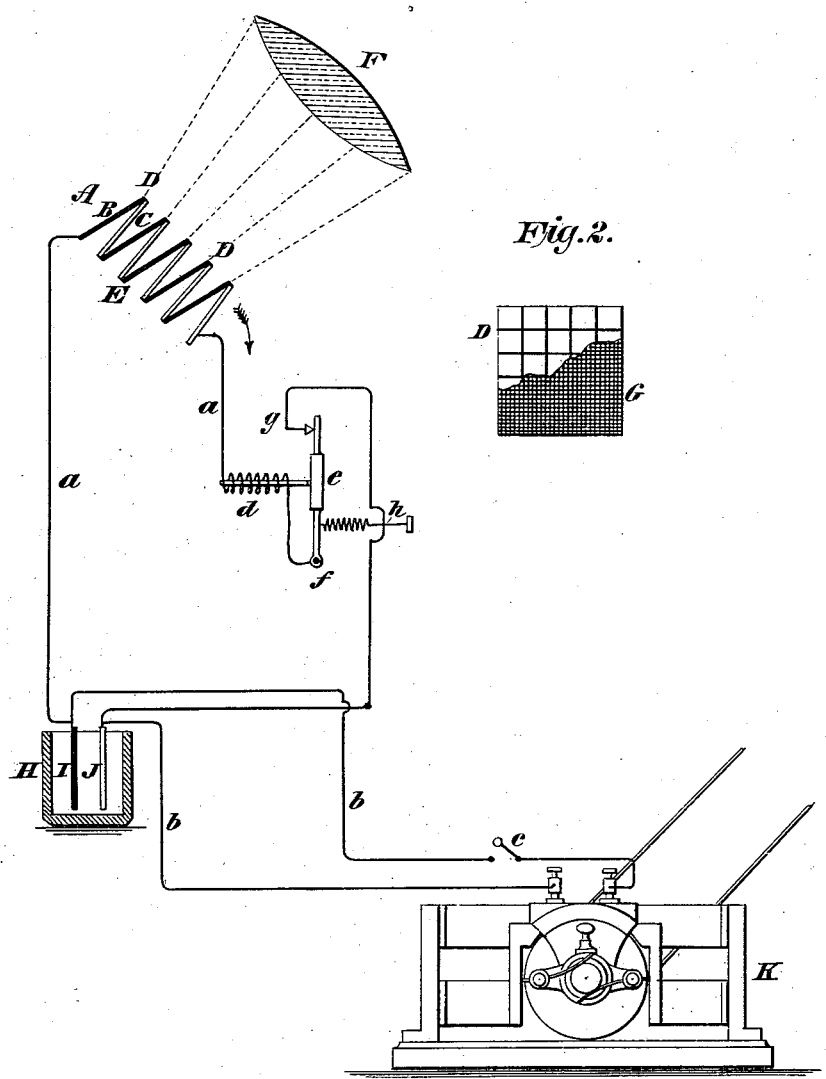
WITNESSES:
Gustave Dietrich
Edgar Goodwin
INVENTOR.
Edward Weston.
BY Park Benjamin
his ATTORNEY.

UNITED STATES PATENT OFFICE.

EDWARD WESTON, OF NEWARK, NEW JERSEY.

ART OF UTILIZING SOLAR RADIANT ENERGY.

SPECIFICATION forming part of Letters Patent No. 389,125, dated September 4, 1888.

Application filed October 17, 1887. Serial No. 252,545. (No model.)

*To all whom it may concern:*

Be it known that I, EDWARD WESTON, of Newark, Essex county, New Jersey, have invented a new and useful Improvement in the Art of Utilizing Solar Radiant Energy, of which the following is a specification.

I propose to transform radiant energy derived from the sun into electrical energy, or through electrical energy into mechanical energy. I may directly employ the electrical energy so obtained, or I may convert it into mechanical energy prior to such utilization.

In order to carry my improvement in the aforesaid art into practical effect, I concentrate or converge the solar beam upon any electro generative apparatus which depends upon an increase of its temperature for the production of an electric current, or, in other words, which will yield electrical energy in a proportion to the increase of temperatures to which it is subjected. A thermo-electric element wherein two bodies of dissimilar metal are placed side by side united at one end, and everywhere else insulated from one another, is such an electro-generative apparatus. When several of such elements are joined in series, so that their alternate junctions lie near together and in one plane, such an arrangement is termed a "thermopile." If one junction of a thermo-electric element or one set of junctions in a thermopile be heated to a fixed temperature and the other junction or set of junctions be maintained at a lower temperature, then an electrical current will be set up in a circuit including said dissimilar metal bodies, the electro-motive force of which current in the thermopile will be the sum of the electro-motive forces of the currents produced by the several elements and will increase up to a maximum proportionately to the increase of temperature. I expose to the solar rays one set of junctions of a thermopile, I thus cause an electrical current in a circuit, including said thermopile. Inasmuch, however, as for practical purposes it is not expedient to construct the face of a thermopile of very large area, I concentrate the solar beam upon the face of the thermopile by any known device for that purpose—such as converging mirror or lens—so that relatively much higher temperature, and hence greater energy per unit of surface area, may be obtained. In order, further, to produce absorption of both heat and light energy, I cover the face of the thermopile with any absorbent material, such as lamp-black; or I may simply dull such surface, so that its capacity for reflecting light-rays may be diminished as far as possible. The electrical current thus obtained I may accumulate in a storage or secondary battery; or I may conduct it directly to any form of electromotor wherein the electrical energy of said current is converted into mechanical energy.

My aforesaid improvement in the art of converting solar radiant energy into electrical energy is susceptible of being applied in many modes and by the use of many forms of apparatus. Thus in place of a thermopile I may employ any form of heat-battery or galvanic cell which at normal temperature yields no current in a circuit including its elements, but which, when the temperature of the electrolyte is augmented by the application of extraneous heat, (as by the solar rays converged upon a transparent vessel containing said electrolyte,) undergoes certain chemical reactions, whereby an electrical current is engendered in its circuit. So, also, as already stated, I may employ various means for converging or concentrating the solar rays upon the electro-generative apparatus.

The mode of carrying my invention into practical effect will from the foregoing be obvious to all skilled in the art; but in addition I will now describe a particular apparatus by which my improvement can be applied with beneficial result, in order to show that the same is capable of being exhibited and performed ir .tual experience. Such apparatus is illustrated in the accompanying electrical diagram, which, it will be understood, does not show exact proportions or details of construction. The combinations embodied in said apparatus I do not herein claim, inasmuch as the same form the subject of another application for Letters Patent of the United States, filed by me simultaneously herewith, Serial No. 252,544.

In the accompanying drawings, Figure 1 is a general diagrammatic view of an apparatus embodying my invention. Fig. 2 represents the heat-receiving surface of the thermopile in plan view.

Similar letters of reference indicate like parts.

Referring to said drawings, A represents a thermopile composed of bars B C of dissimilar metals joined at D and E.

F is a lens, whereby the solar rays are concentrated or converged upon the surface formed by the junctions D of said pile. Said surface may be covered with a light-absorbing material, G, as lamp-black, substantially as indicated in Fig. 2, where a portion of said covering is represented as broken away, or be simply dulled or darkened, so as not to reflect light-rays.

The thermopile A is connected by wires $a\ a$ in circuit with the electrodes I J of the secondary cell H, and said electrodes are also connected by wires $b\ b$ with the binding-posts of any form of electromotor, as K. Interposed in one of the wires $b$ is an ordinary circuit-closer, $c$, whereby circuit can be established or broken between the secondary cell H and motor K.

At $d$ is an electro magnet having its coil in circuit with one of the wires $a$. The armature $e$ of said magnet is polarized. Said armature is pivoted at $f$, and is connected to one terminal of the magnet-coil, so that the circuit proceeds from the coil through the armature to a stop, $g$, wherewith the armature makes contact when attracted by the electro-magnet, and thence to the secondary cell H. A spiral spring, $h$, attached to the pivoted armature, aids in retracting the same from the pole of the magnet.

When the current proceeds from the thermopile to the secondary cell, the magnet and the polarized armature mutually attract, and the circuit to the secondary cell is maintained. When, however, the strength of the current in the cell becomes greater than that passing to the cell, then the magnet-poles are reversed and magnet and armature mutually repel, and circuit between cell and thermopile is broken. In this way short-circuiting of the cell through the thermopile may be prevented. This arrangement of automatic circuit-closer I do not claim. I introduce it here merely as illustrative of known apparatus practically useful for the purpose stated.

The object of the storage or secondary cell is to accumulate the solar radiant energy in the form of electrical energy, so that, for example, energy accumulated during hours of sunshine may be utilized during night or periods of cloudy weather; or, in other words, said cell here acts substantially as a reservoir into which electrical energy may be intermittently delivered, but from which it may be taken as a constant supply.

I am well aware that various devices have been contrived for directly utilizing solar heat to produce steam or hot air, or for measuring the intensity of solar radiation; but I am not aware that the utilization of the sun's heat and light-rays through the conversion of solar radiant energy into electrical energy or into mechanical energy through intermediate conversion into electrical energy has hitherto been accomplished.

I do not claim herein the improvement in the art utilizing solar radiant energy by converting said solar energy into mechanical energy, which consists in converting said solar energy into electrical energy, and then converting said electrical energy into mechanical energy, because I intend to make that invention the subject-matter of another application for Letters Patent hereafter to be filed, and of this reservation public notice is hereby given.

I claim—

1. The improvement in the art of utilizing solar radiant energy, which consists in converting said solar energy into electrical energy, and then storing and accumulating said electrical energy, substantially as described.

2. The improvement in the art of utilizing and storing solar radiant energy through converting said solar energy into accumulated electrical energy, which consists in concentrating or converging the solar rays upon, and thereby rendering active to produce an electrical current, an electro-generative apparatus capable of converting heat energy into electrical energy, and then accumulating said electrical energy in a secondary or storage cell, substantially as described.

EDWARD WESTON.

Witnesses:
H. A. BECKMEYER,
E. E. CARY.